3,106,475
BURNED REFRACTORY PRODUCT
Ben Davies and Ernest P. Weaver, Pittsburgh, Pa., assignors to Harbison-Walker Refractories Company, Pittsburgh, Pa., a corporation of Pennsylvania
No Drawing. Filed May 29, 1961, Ser. No. 113,094
2 Claims. (Cl. 106—58)

This invention relates to refractories for oxygen steelmaking converters and in particular it concerns burned basic refractory brick particularly suitable for use in the production of steel by the oxygen blowing process, variously referred to as the LD process, the oxygen converter process, or merely as oxygen steelmaking.

Although not limited to this application, the invention provides a refractory especially adapted to this service. The oxygen converter process is only some ten years old but its unique ability to provide good quality steel at a rapid rate has so influenced the steel producing industry that more and more vessels, a term employed to describe the converter, are being built. Some recent articles in the trade journals have predicted that no new open hearth furnaces will be constructed, because the oxygen converters will supply the needed additional capacity. This prediction is based not only on the speed with which steel can be produced, but also from the much lower initial capital outlay necessary to build an oxygen converter.

The great interest in the oxygen steelmaking process has stimulated considerable pressure on the manufacturers of refractories to supply products better able to withstand the chemical and physical conditions present in the vessel.

In the oxygen converter process, the slag produced is essentially basic and, therefore, a lining of basic refractory material has been used. The lining material most generally used in this country and in Europe is dead burned dolomite bonded with a non-aqueous tar or pitch. Such a mix is either formed into bricks or rammed into a monolithic construction. Other practices involve the substitution of fine dead burned magnesia for part of the dolomite as the fine fraction of the mix. Thus, a batch of coarse dolomite and fine magnesia grains bonded with a tar or pitch is used. As is well known, dolomite hydrates readily when exposed to the moisture of the atmosphere. The tendency to hydrate is reduced by the coating of the non-aqueous tar or pitch which is used as a bonding medium. The use of the magnesia in the fine portion in substitution for lime or dolomite improves the resistance of the brick to attack by moisture, because magnesia hydrates more slowly than dolomite.

Brick of the type described have given good service in oxygen vessels. They possess sufficiently high refractoriness to withstand the extremely high temperatures present during the actual blowing and exhibit good resistance to the corrosive effect of the slag. However, these bricks are not wholly satisfactory in terms of strength, resistance to abrasion, and resistance to thermal shock.

An abbreviated description of the oxygen converter process shows the charging of molten pig iron and scrap (up to 50 percent scrap) into the vessel along with slag forming ingredients, such as lime and limestone. Oxygen is blown onto the surface of the molten metal. After the reaction of the oxygen with the impurities of the metal is completed, the oxygen lance is removed and the finished steel poured from the vessel.

A converter is expected to go through at least 200 heats before the lining is replaced. As can be understood, the refractory surface upon which the molten pig iron and scrap is charged each heat must be strong to withstand the repeated impact of these materials. Likewise, those surfaces must show good resistance to the abrasion of the charged materials as well as the movement of the molten steel during pouring. And, finally, the refractory must be resistant to thermal spalling resulting from the abrupt changes in temperatures occurring in the charging, blowing, and pouring steps.

It is known that burned basic brick frequently possess much greater strength than unburned brick due to the ceramic bond formed through the firing process. There is normally a direct correlation between brick strength and abrasion resistance. Thus, as the strength of the brick increases, its resistance to abrasion likewise increases. However, it is also known in the art that burned basic brick are generally much more prone to spalling than are chemically-bonded or unburned brick. This spalling tendency also made necessary a burning-in or heat-up time of ten to twelve hours for new linings, whereas the tar-bonded unburned brick linings could be safely heated up in one to five hours.

It is the primary object of the present invention to provide a refractory product particularly adapted for use in the oxygen converter, that can be produced with conventional techniques and materials, and that contributes to improved operation of oxygen converters.

This and other objects are attained in accordance with our discovery that a tar impregnated burned brick of at least 96 weight percent, and preferably higher, MgO gives ideal service in those areas of an oxygen converter where resistance to impact, abrasion, and spalling is critical. These brick are used in areas of the oxygen converter such as the charging side where the charged materials are dropped into the vessel, and the cone section which heretofore has been abraded and worn during charging and when the hot metal is poured and mechanical abuse in removing buildup. By using the brick in those locations, their outstanding properties are utilized, and the destruction of lining material due to impact, abrasion and spalling is lessened. Accordingly, the lining need not be replaced or repaired as frequently as has been necessary heretofore.

Brick in accordance with the present invention are made from dead burned magnesia made synthetically from seawater or brine. Magnesia thus obtained can be produced with the high MgO content that is critically essential for this invention, whereas natural magnesite, when dead burned, does not result in the essential MgO analysis. A minimum MgO content of 96 weight percent, and preferably 97 weight percent or higher, on an ignition-free basis, is used. The remainder of the brick generally comprises silica, iron oxide, alumina and lime.

The magnesia brick can be made by any of the processes that are now used for making refractory products. For example, the brick shapes can be pressed, hammered, rammed, extruded, or formed by any other method known to the art. The magnesia that is used in forming the brick batch is dead burned to high purity and high density. Particularly satisfactory grain for this purpose can be obtained by dead burning caustic calcined magnesia at an elevated temperature of about 2900° F. or higher in a rotary kiln. Alternatively, the caustic calcined magnesia can be dry-formed into small compressed bodies at a pressure of at least 20,000 p.s.i. Thereafter, the compressed bodies are dead burned at a high temperature, preferably at a temperature above 3400° F. or even as high as 4200° F., for example in a shaft kiln. The resulting very dense grain is crushed and graded to provide a conventional brick screen analysis. A temporary binder is incorporated in the batch, and then brick are shaped therefrom. A particularly desirable procedure for obtaining high purity, dead burned MgO to be used in preparing brick is set forth in the copending application of Snyder et al., Serial No. 847,864, filed October 22, 1959.

The brick are then fired. A conventional practice is to heat them to about 2900° F. and hold at that temperature for an extended period, say about 10 hours. After cooling, the brick are impregnated with tar or pitch. That is accomplished by immersing the burned brick in liquefied pitch, generally heated to about 400° F., for about one-half hour. Surprisingly, the pitch penetrates throughout, and substantially as much pitch can be incorporated in a brick in this fashion as can be accomplished by tar bonding with liquefied pitch. Commercially available tar or pitch, of petroleum or coal base, can be used for this purpose. Generally, a coal base pitch having a softening point on the order of 150° F. is used.

The invention will be described further in conjunction with the following examples in which the details are given by way of illustration and not by way of limitation.

EXAMPLE 1

Dead burned magnesia made synthetically from seawater in accordance with the procedure set forth in the aforementioned application Serial No. 847,864 was used in this example. It had the following composition, in weight percent:

| | Percent |
|---|---|
| $SiO_2$ | 0.9 |
| $Al_2O_3$ | 0.4 |
| $Fe_2O_3$ | 0.3 |
| CaO | 1.1 |
| MgO | 97.3 |

The dense grain was crushed and sized to a screen analysis, in weight percent, as follows:

| | Percent |
|---|---|
| −4+10 | 40 |
| −10+28 | 15 |
| −28+65 | 15 |
| −65 | 30 |

About 5 percent by weight of concentrated waste sulfite liquor, that served as a temporary binder, was added to the batch and then brick were pressed at 8000 p.s.i. The brick were then fired at 2900° F. and held for 10 hours. Pitch heated to a temperature of 400° F. was then used to impregnate these brick, which was accomplished by immersing the brick in the fluid pitch for about one-half hour.

For comparison purposes, brick having an analysis outside the limits of composition of this invention were made.

EXAMPLE 2

Following the procedure used in Example 1, brick were made from dead burner Austrian magnesite of the following analysis:

| | Percent |
|---|---|
| $SiO_2$ | 0.6 |
| $Al_2O_3$ | 0.6 |
| $Fe_2O_3$ | 6.5 |
| CaO | 3.3 |
| MgO | 88.7 |

Actually, brick of this composition have been used in the oxygen converter. It has been found, however, that both lowered refractoriness of the brick and spalling with these brick were material problems that could not be overlooked.

EXAMPLE 3

To show the criticality of the MgO content, as distinguished from the source of MgO, brick were formed from synthetic dead burned magnesite prepared from seawater and having the following analysis, in weight percent, in the dead burned condition:

| | Percent |
|---|---|
| $SiO_2$ | 4.7 |
| $Al_2O_3$ | 0.3 |
| $Fe_2O_3$ | 0.7 |
| CaO | 1.4 |
| MgO | 92.9 |

These brick were made with the procedure of Example 1. Commercial scale tests of these brick showed that spalling was a severe problem.

In addition to the foregoing examples, brick containing lime in an amount of at least 5 weight percent and generally made according to the procedure of the copending application of King et al., Serial No. 38,438, were prepared as follows:

EXAMPLE 4

Dead burned high purity dolomite and synthetic magnesia of the following analyses were used:

| | Dolomite, percent | Magnesia, percent |
|---|---|---|
| $SiO_2$ | 0.14 | 2.8 |
| $Al_2O_3$ | 0.25 | 0.3 |
| $Fe_2O_3$ | 0.09 | 0.6 |
| CaO | 57.75 | 1.5 |
| MgO | 41.74 | 94.8 |

The dolomite and magnesia materials were crushed and sized in accordance with standard refractory practice and combined to give a 60:40 mix by weight. The sized material was heated to about 230° F. and about 2.5 percent by weight of melted paraffin was blended with the batch. Brick were then pressed from the batch at about 8000 p.s.i. The brick were placed in a kiln and the temperature raised rapidly to about 2700° F., in the manner set forth in the copending application of Renkey, Serial No. 808,014, now United States Patent No. 2,971,240, and held for 5 hours. The burned brick were then boiled in tar to impregnate them. The analysis of the burned brick was as follows:

| | Percent |
|---|---|
| $SiO_2$ | 1.2 |
| $Al_2O_3$ | 0.2 |
| $Fe_2O_3$ | 0.4 |
| CaO | 35.4 |
| MgO | 63.0 |

EXAMPLE 5

Ninety parts by weight of high purity magnesia and ten parts by weight of high purity lime of the following compositions

| | Lime, percent | Magnesia, percent |
|---|---|---|
| $SiO_2$ | 1.6 | 1.6 |
| $Al_2O_3$ | 0.3 | 0.3 |
| $Fe_2O_3$ | 0.8 | 0.6 |
| CaO | 96.3 | 1.4 |
| MgO | 0.9 | 96.1 | on the ignition free basis were mixed together as the refractory batch. Brick were then prepared in the same manner as set forth in Example 4. An analysis of the burned brick showed:

| | Percent |
|---|---|
| $SiO_2$ | 1.6 |
| $Al_2O_3$ | 0.3 |
| $Fe_2O_3$ | 0.6 |
| CaO | 10.8 |
| MgO | 86.6 |

Brick from each of the foregoing examples were then tested in accordance with standard tests. The physical properties of the brick of the above-described examples before impregnation are as follows:

Table I

| Example | 1 | 2 | 3 | 4 | 5 |
|---|---|---|---|---|---|
| Bulk Density, p.c.f. | 188 | 174 | 173 | 166 | 175 |
| Modulus of Rupture, p.s.i. | 3,100 | 2,180 | 2,910 | 2,100 | 2,700 |
| Panel Spalling test (ASTM C-122) 3,000° F. preheat, weight loss percent | 0.0 | 41 | 34 | (1) | (1) |
| Load Test, 25 p.s.i., Temperature of failure, °F | +3,200 | 2,575 | 2,990 | 3,150 | 3,100 |

[1] ASTM C-122 requires an air-water mist blast. Examples 4 and 5, containing free lime, hydrated so readily in this test that no valid results could be obtained.

These data demonstrate the superiority in physical properties which the brick of our invention have over brick made in accordance with prior practices. The density and strength are markedly improved as in the refractoriness. The resistance to thermal shock as evidenced by a 0.0 percent spalling loss when combined with their great strength renders them particularly suitable in locations where mechanical wear and rapid temperature changes are present. Although Examples 4 and 5 could not be run in the panel spalling test, actual service experience has evidenced the tendency to spall.

From the foregoing discussion and description, it is evident that our invention provides brick that are uniquely suited to application in those zones of an oxygen converter or other vessel where abrasion resistance, great strength, and resistance to spalling are required. These properties have been provided in bricks in accordance with this invention by the composition that has been used rather than the method of manufacture. Hence, the invention is particularly advantageous in that it can be practiced with skills and materials presently available in the art.

Unless otherwise stated, all percentages given are by weight.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. Oxygen converter refractory brick consisting essentially of at least 96 weight percent of MgO, said brick being burned and tar impregnated throughout and being highly resistant to impact, to abrasion and to spalling under abrupt temperature changes, said brick having substantially no loss in an ASTM C-122 panel spalling test with a 3000° F. reheat.

2. A refractory product of improved resistance to spalling, to impact and to abrasion, for use at high temperatures consisting essentially of a ceramically bonded, tar impregnated refractory shape having an MgO content, based on the solids, of at least 96 weight percent, said tar impregnation extending throughout the shape, said shape having substantially no loss in an ASTM C-122 panel spalling test with a 3000° F. reheat.

References Cited in the file of this patent
UNITED STATES PATENTS
2,952,605    De Varda _____ Sept. 13, 1960